United States Patent [19]
van Eikeren et al.

[11] Patent Number: 5,091,080
[45] Date of Patent: Feb. 25, 1992

[54] ADSORBENTS FOR THE REMOVAL OF VOLATILE SUBSTANCES FROM AQUEOUS SYSTEMS

[75] Inventors: Paul van Eikeren; Daniel J. Brose; Scott M. Herbig, all of Bend, Oreg.

[73] Assignee: Bend Research, Inc., Bend, Oreg.

[21] Appl. No.: 621,022

[22] Filed: Nov. 30, 1990

[51] Int. Cl.$^5$ .................................. B01D 19/00
[52] U.S. Cl. .............................. 210/188; 210/500.23; 210/500.29; 210/502.1; 210/504; 55/16; 55/158
[58] Field of Search ............... 210/634, 635, 760, 511, 210/633, 691, 692, 638, 502.1, 317, 500.29, 188, 640, 443, 500.23, 504; 55/66, 74, 389, 387, 16, 158; 435/176

[56] References Cited

U.S. PATENT DOCUMENTS 3,911,080 10/1975 Mehl et al. ............................ 55/16
4,728,432 3/1988 Sugiyama et al. .................. 210/691
4,886,598 12/1989 Barkey ............................. 210/502.1

FOREIGN PATENT DOCUMENTS 953414 7/1961 United Kingdom ........... 210/500.29

Primary Examiner—Robert A. Dawson
Assistant Examiner—Ana Fortuna
Attorney, Agent, or Firm—Chernoff, Vilhauer, McClung & Stenzel

[57] ABSTRACT

Semipermeable membrane-enclosed solid core adsorbent devices for the selective removal of volatile chemical species from an aqueous environment are disclosed.

18 Claims, 1 Drawing Sheet

ADSORBENTS FOR THE REMOVAL OF VOLATILE SUBSTANCES FROM AQUEOUS SYSTEMS

BACKGROUND OF THE INVENTION

There is an ongoing need for the selective and efficient removal of undesirable volatile chemical species from aqueous environments. With the increasing concern for the environment, this need has become pressing. Such selective chemical species removal has also found increasing application in the health care, food and beverage industries. The present invention is concerned with a novel device to accomplish such removal.

Ammonia has been stripped from aqueous streams by conventional packed towers, but has been criticized for releasing ammonia to the atmosphere and often results in fouling of the packing materials. Polar organic solvents were reported to be removed from aqueous solutions by hydrophobic adsorbents of ion exchange particles in a 1987 University of California, Berkeley, Dissertation Thesis by William G. Rixley entitled "Non-Wetting Adsorbents for the Recovery of Solutes from Dilute Aqueous Solutions."

SUMMARY OF THE INVENTION

The present invention comprises an adsorbent device for the selective removal of a volatile and trappable chemical species from an aqueous environment comprising at least one non-liquid core containing at least one trapping agent, the core being continuously enclosed by a semipermeable membrane.

DETAILED DESCRIPTION OF THE INVENTION

Figure 1:
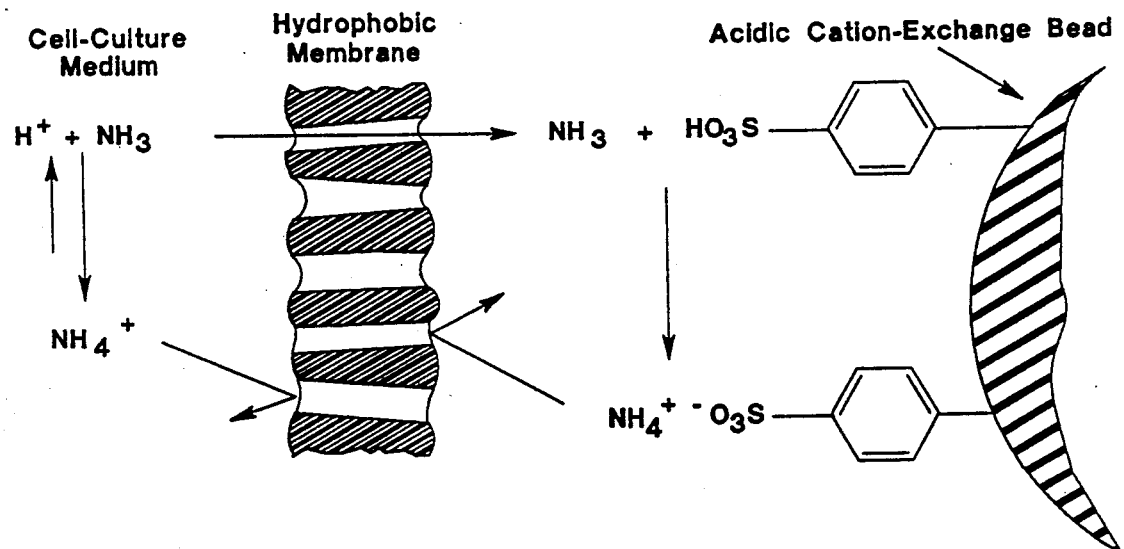
FIG. 1 is a schematic of an exemplary supported-gas-membrane-coated bead containing a trapping agent for ammonia removal in accordance with the present invention.

In accordance with the present invention there is provided a novel device and associated method for the extraction of volatile species from aqueous systems. In its simplest form, the device comprises one or more solid cores, each core containing at least one trapping agent, with the core(s) being continuously enclosed by a semi-permeable membrane. By "solid" is meant non-liquid and non-gaseous, including dense and porous solids and gels. "Trapping agent" is defined to mean any anionic, cationic, reducing, oxidizing or neutral chemical species capable of neutralizing, reducing, oxidizing or complexing with the volatile and trappable species to be removed from the aqueous environment. The volatile and trappable species may be acidic, basic or neutral. "Semipermeable" is defined to mean freely permeable to gases but substantially impermeable to liquid water, such as in the case of microporous hydrophobic polymers. Dense solid cores may have the trapping agent coated or chemically bonded to their exterior, may comprise matrices within which the trapping agent is entrapped or chemically bonded, or may comprise the trapping agent itself. Especially preferred dense and porous solid cores are those of polystyrene, polyacrylate, polyamide, polyester, cellulose acetate or regenerated cellulose. Materials also preferred for porous solid cores are ceramics, silica, alumina, glass and various forms of diatomaceous earth. Porous solid cores may be filled with liquid or gel trapping agents. Gels may comprise a mixture of trapping agent, water and a hydrophilic polymer gelling agent. Exemplary gelling agents include acrylamide polymers such as polyacrylamide and partially hydrolyzed polyacrylamide; acrylic acid and methacrylic acid polymers and copolymers of maleic and acrylic acids; vinyl carboxylic acid polymers and copolymers; cellulosics such as cellulose, carboxymethyl cellulose, 2,3-di-(2,3-diiodopropoxy)propylcellulose, cellulose thiocyanate, and cellulose ether-polyacrylamide aqueous gels; epoxy polymers; ethylene oxide polymers; phenol-formaldehyde condensation polymers; gelatin and gelatin products; natural gums such as tamarind gum, xanthan gum, xylitol gum, galactomannan gum, and polygalactomannan allyl ether gel; polyamides such as polyamide resin, poly-(amide-imide) resin, and poly(m-phenylene isophthalamide); polyesters such as vinyl ester copolymer and vinyl acetate copoymer; polyethylenimines; polyurethanes; polyvinyl alcohols; polyvinylpyrrolidone, N-vinylpyrrolidone-vinyl alkylcarboxylate copolymer, and N-vinylpyrrolidone-alkyl acrylate copolymer; and hydrolyzed polyacrylonitrile-grafted starch. In all cases, the trapping agent may be acidic, basic, neutral, oxidizing or reducing so long as, in those cases where there is more than one type, the agents are such that they do not neutralize each other.

The solid trapping agent-containing cores are surrounded or completely and continuously enclosed by a semipermeable membrane in one of four different forms: (1) a coating directly on the core; (2) a capsule; (3) sealed hollow fibers; and (4) a pouch. The adsorbent devices may be used for the selective removal of volatile species from aqueous systems by simply contacting the aqueous system containing the undesirable species with the adsorbent devices. Such contact may be effected in conventional ways such as dispersing the devices in the aqueous system, in packed towers and columns, and in fluidized beds.

Six basic forms of the device and a large number of exemplary trapping agent types are set forth below. Table 1 shows a number of exemplary systems and commercial applications useable with all six basic forms of the device. The term "alkyl" in Table 1 in reference to sulfides means such compounds containing from 1 to 18 carbon atoms, while the terms "alcohols" and "carboxylic acids" in the same table refer to such compounds containing from 1 to 18 carbon atoms.

Bead and Pouch Types

1: supported-gas-membrane-coated solid beads
2: supported gas-membrane-coated liquid-filled porous beads
3: supported-gas-membrane-coated aqueous gel beads
4: supported-gas membrane capsules enclosing a solid or gel
5: supported-gas hollow fibers sealed at both ends and enclosing a solid or gel
6: pouches consisting of a supported-gas membrane enclosing a solid or gel

Trapping Agent Types

A: aqueous $H_2SO_4$ in liquid or gel form

B: polystyrene sulfonate resin (in H+ form) cation exchange beads such as Dowex® HCR-S (Dow Chemical Co., Midland, Mich.), Dowex® MSC-1 macroporous resin, Dowex® 50, and Amberlite® IRA-1184
C: tetrafluoroethylene sulfonate resin beads (in H+ form) such as Nafion (DuPont, Wilmington, Del.)
D: aqueous sodium hydroxide or sodium carbonate in liquid or gel form
E: polystyrene trialkyl ammonium resin anion exchange beads (in OH− form) such as Dowex®-1 (trimethylbenzyl ammonium), Dowex®-2 (dimethyl ethanol benzyl ammonium), Dowex® SBR, and Amberlite® IRA-400
F: poly(2-acrylamido-2-methyl-1-propanesulfonic acid) beads
G: poly(2-acrylamido-2-methyl-1-propanesulfonic acid-co-styrene) beads
H: poly(acrylic acid) beads and poly(acrylic acid) grafted on starch such as Waterlock (Grain Processing Corp., Muscatine, Iowa)
I: poly(alkylamine) beads
J: poly(ethylenimine) on silica beads or benzylated poly(ethyleneimines) on silica beads
K: poly(vinyl pyridine) beads
L: aqueous tetraethylene pentamine or low molecular weight poly(ethyleneimine) in liquid or gel form
M: anion exchange resin beads (in borohydrate or $BH_4^{31}$ form)
N: aqueous hydroxylamine or hydrazine in liquid or gel form
O: aqueous glucose/glucose oxidase/catalase in liquid, gel or solid form
P: glucose/glucose oxidase/catalase coated on Celite® particles (Manville Corp., Denver, Colo.)
Q: aqueous ferrous sulfate in liquid, gel or solid form
R: Schiff-base oxygen carriers
S: aqueous monoethanolamine, diethanolamine, triethanolamine, 2-amino-2-methyl-1-propanol, or 2-(ethylamino)-ethanol in liquid or gel form
T: anion exchange resin beads (in hydrochromate or $HCrO_4^-$ form)

TABLE 1

| Volatile Species | Trapping Agents | | Applications |
| --- | --- | --- | --- |
| | Class | Types | |
| Ammonia | acidic | A, B, C, F, G, H | mammalian cell culture aquaculture fermentation diapers (odor) removal) blood detoxification waste stream treatment |
| Hydrogen cyanide | basic | D, E, I, J, L | food processing (e.g., almonds and peaches) reactions catalyzed by the enzyme oxynitrilase waste treatment |
| Carbon Dioxide | basic | D, E, I, J, L, S | aquaculture analytical methods to obtain total organic carbon beverages (e.g., beer and wine) |
| Hydrogen sulfide | basic | D, E, I, J, L, S | water treatment removal of undesirable odors |

TABLE 1-continued

| Volatile Species | Trapping Agents | | Applications |
| --- | --- | --- | --- |
| | Class | Types | |
| Alkyl sulfides | basic | D, E, I, J, L, S | and tastes from foods and beverages removal of sulfur |
| Sulfur dioxide | basic | D, E, I, J, L, S | dioxide preservative in foods and beverages |
| Carboxylic acids | basic | D, E, I, J, K, L | deacidifying foods and beverages removal of undesirable odors and tastes from foods and beverages waste treatment fermentation product recovery |
| Aldehydes and ketones | neutral | I, J, L, M, N | fermentation foods and beverages nicotinamide cofactor regeneration reduction reactions catalyzed by alcohol dehydrogenases |
| Oxygen | neutral | O, P, Q, R | food processing beverages (e.g., beer and wine) pharmaceutical formulations anaerobic fermentations aqueous high performance liquid chromatography solvents |
| Halogens | neutral | D, E, M | waste treatment dechlorination of household water |
| Alcohols | neutral | T | nicotinamide cofactor regeneration oxidation reactions catalyzed by alcohol dehydrogenase |

One particularly preferred embodiment of the present invention comprises highly selective ammonia-absorbent beads comprising strongly acidic cation-exchange resin covered with a supported-gas membrane. The trapping mechanism and methods of fabrication for such membrane-coated beads is essentially the same for all five types of beads and particles disclosed above. The membrane consists of a gas layer about 100 microns thick that separates the aqueous ammonia-containing solution from the strongly acidic cation-exchange beads. The gas layer is supported and stabilized within the pores of a hydrophobic or non-water-wettable polymer film that is coated on the cation-exchange bead. Since water cannot wet the polymer film, the ammonia solution cannot contact the strongly acidic cation-exchange bead. Permeation through the supported-gas membranes is very selective in that only volatile solutes such as ammonia pass through the membrane, while nonvolatile solutes are completely rejected.

Ammonia removal from a cell culture solution by a bead coated with a supported-gas membrane is illustrated in FIG. 1. A feed solution containing ammonium ion in equilibrium with dissolved ammonia is shown on the left, outside of the membrane shown in cross section, and a strongly acidic cation-exchange bead core is on the right. The membrane and bead are shown in FIG. 1 in an exploded sectional view for illustrative purposes, but in use are in immediate contact with each other. Ammonia from the feed solution evaporates at the feed-solution/gas interface and is transported across the membrane to the cation-exchange bead by diffusion. At the surface of the cation-exchange bead, ammonia is irreversibly protonated to the ammonium ion and bound to sulfonate groups on the bead. Because the resulting concentration of free ammonia in the cation-exchange bead is near zero, ammonia is effectively trapped in the bead in the form of ammonium ion.

Such ammonia-absorbent beads can be sterilized and suspended directly in cell-culture medium. Such beads are particularly useful in small cell-culture reactors for the production of protein product for such animal and human health products as monoclonal anti-bodies, viral antigens, enzymes, and hormones, and offer substantial improvements over existing systems: (1) because the culture medium will contain less ammonia, the absorbent system will improve the productivity of mammalian-cell cultures; (2) because there will be no need to periodically dilute the culture medium to reduce the ammonium-ion concentration, product concentrations will be higher and downstream processing costs reduced; (3) because the process allows treatment and reuse of culture cell medium, medium cost will be reduced substantially; and (4) a quick method of testing the sensitivity of cell lines to ammonia toxicity is provided.

The microporous membrane-coated beads of the present invention may be fabricated by coating bead or particle cores with a hydrophobic polymer or polymer blend solution consisting of polymer, solvent, and a nonsolvent. Especially preferred hydrophobic polymers include polyethylene (PE), polypropylene (PP), polysulfone (PS), polyethersulfone (PES), poly(vinylidene difluoride) (PVDF), poly(tetrafluoroethylene) (PTFE), and compatible mixtures thereof. Other suitable polymers useful for the hydrophobic bead or core coating are set forth in Table 2, including blends thereof and blends thereof with perfluoro compounds. The membrane is formed by coating the bead with a wet coat of polymer in solvent followed by immersing the coated bead in a quench bath from $-70°$ C. to $+100°$ C. where the solvent exchanges with the quench solution, causing the polymer to undergo phase separation and precipitate (phase inversion) around the bead. The porosity, thickness, and pore-size distribution of the resulting membrane can be controlled by adjustments of process parameters such as quench bath composition, temperature of the polymer solution and/or the quench bath, and the composition of the polymer solution. Generally speaking, porosity and pore size increase with an increase in solvent concentration in the quench bath, with an increase in nonsolvent concentration in the polymer solution and an increase in temperature in the polymer solution, with an increase in the temperature of the quench bath, with a decrease in polymer concentration in the polymer solution, with the addition of "pore-formers" such as glycerol to the polymer solution, and with the inclusion of two or more polymers in the polymer solution that phase separate upon precipitation. Thickness of the membrane can be increased by increasing the viscosity of the polymer solution, by increasing the spray rate of the polymer solution, and by decreasing the spray rate of the atomizing air.

TABLE 2

| | |
|---|---|
| Poly(1,1-dihydro-perfluorooctyl methacrylate) | Polyepichlorohydrin |
| Poly(hexafluoropropylene) | Poly(nonamethylene azelamide) |
| Poly(trifluoroethylene) | Rubber hydrochloride |
| Poly(vinylidene fluoride) | Poly(alphy-methyl styrene) |
| Poly(1,2-butadiene) | Poly(vinyl acetate) |
| Poly(4-methyl-1-pentene) | Chlorosulfonated polyethylene |
| Polyisobutylene | |
| Poly(vinyl fluoride) | Chlorinated polyisoprene |
| Poly(vinyl methyl ether) | |
| Poly(t-butylstyrene) | Poly(methyl methacrylate) |
| trans-Polyisoprene | |
| Poly(chlorotrifluoroethylene) | Polychloroprene |
| cis-Polyisoprene | Poly(vinyl chloride) |
| trans-Polybutadiene | Poly(vinylidene chloride) |
| cis-Polybutadiene | |
| Poly(decamethylene sebacamide) | Poly(methyl acrylate) |
| Poly(ethyl methacrylate) | Polycarbonate |
| Polystyrene | Poly(ethylene terephthalate) |
| Poly(octamethylene suberamide) | |
| Cyclized polyisoprene | Poly(heptamethylene pimelamide) |
| Poly(ethyl acrylate) | |

Three exemplary coating processes may be used to apply hydrophobic microporous coatings on ion-exchange resin. One process utilizes a three-fluid nozzle to mix the beads with the coating solution, which is then precipitated in a quench bath. A second process incorporates the ion exchange resin into a microporous polyethylene matrix which is then coated with the desired polymer coating solution, followed by precipitation in a quench bath. The third process comprises introducing water-wet ion exchange beads into a bath of the polymer coating solution, which precipitates around the wet beads. All three processes produce leak-free coatings on ion exchange resin beads.

Cores consisting of gels and a trapping agent may be made by swelling commercially available gels with a solution containing a trapping agent. For example, polyacrylamide beads (e.g., Bio-Gel P-6, Bio-Rad Laboratories, Richmond, Calif.) can be purchased in the dry state and then swollen in an aqueous solution containing a trapping agent to form a gel. The trapping agent may be an acid (e.g., $H_2SO_4$), a base (e.g., NaOH), or an organic compound (e.g., ethanolamines). Once swollen, the polyacrylamide gel consists of greater than 80 wt % of the aqueous solution and still remains as discrete non-agglomerating beads. These swollen beads may then be coated with a semipermeable membrane coating in the same manner as described below in Example 3. Such cores may also be made from a solution containing water, a trapping agent, and the gelling material. For example, gelling materials such as gelatin or polyvinyl alcohol may be dissolved in aqueous solutions containing a trapping agent and then dripped or sprayed into a drying chamber to form discrete gel particles or beads as water is evaporated from the solution and/or as the temperature of the solution is lowered. Trapping agents may be water-soluble or suspended in a solution containing water and a gelling material. These particles may then be coated with a semipermeable coating as described in Example 3. In addition, the solution containing water, a trapping agent, and the gelling material may be dripped or sprayed directly into the polymer coating solution as described in Example 3. Once coated with the polymer solution, the coated cores may be dried, forming a gel in the core as the solution cools and water evaporates.

Capsules of the present invention having walls of porous polymers can be made by dip-coating mandrels in a polymer solution that has a viscosity between 1000 and 3000 cps; the coated mandrels are then air-dried at room temperature for about 5 seconds and then immersed in a quench bath (typically water). In the quench bath, the polymer precipitates (phase-inversion process) forming porous-walled capsules. The capsules are slipped off the mandrels after they are removed from the quench bath and allowed to air-dry at room temperature. The mandrels can be coated with a release agent such as silicone or lecithin lubricants prior to dip-coating so the capsules can be removed easily. Capsules formed by this procedure typically have walls about 200 microns thick.

Figure 2:
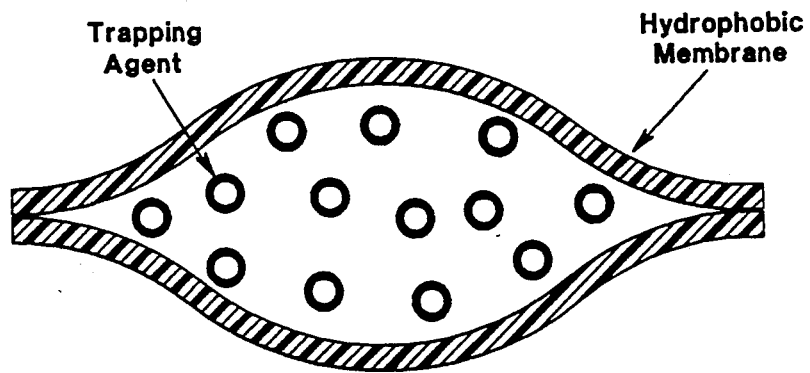
FIG. 2 is a schematic of an exemplary supported-gas-membrane pouch containing a trapping agent on or in a bead substrate in accordance with the present invention.

Pouches in accordance with the present invention comprise two pieces of flat-sheet, porous, hydrophobic membrane that have been sealed together to contain nonmembrane-coated bead substrates or pure trapping agent between the two pieces of membrane. FIG. 2 shows a cross-sectional side view of such a pouch wherein the small spheres represent beads containing trapping agent. The membrane used in such pouches can be any porous, hydrophobic membrane. Exemplary membranes include PE, PP, PS, PES, PVDF and PTFE. The mechanism for volatile species adsorption by such pouches is identical to that described for membrane-coated beads.

EXAMPLE 1

A three-fluid nozzle was used to coextrude a mixture of strongly-acidic cation exchange resin (Dowex® MSC-1) and a solution consisting of 11 wt % cellulose acetate (CA 398-10, Eastman Chemicals, Kingsport, Tenn.) and 7 wt % glycerol dissolved in acetone with a polymer coating solution consisting of 20 wt % PS (Udel P1700, Amoco Performance Products, Ridgefield, Conn.) dissolved in dimethylacetamide (DMAC). The resin-containing mixture was surrounded first by the CA solution, which was in turn surrounded by the PS solution as the two streams exited the nozzle. An air stream was used to disrupt the two liquid streams, forming droplets. The droplets were sprayed directly into a 20° C. water quench bath where the polymers precipitated due to the exchange of nonsolvent in the quench bath with the solvents in the polymer solutions. The polymers formed an asymmetric microporous coating typical of membranes formed by this same type of phase-inversion process. The CA prevented the resin from migrating to the surface of the outer PS coating, the PS forming a continuous microporous coating around the resin and CA core.

EXAMPLE 2

Dowex MSC-1 resin was incorporated into a polyethylene (PE) matrix to minimize the incompatibility between the resin and the PS coating. The resin was crushed to a fine powder and mixed with a solution of 15 wt % PE (Tenite 808, Eastman Chemicals, Kingsport, Tenn.) dissolved in olive oil at 130° C. This mixture was sprayed out of an air-atomizing nozzle into a water bath at 20° C. which caused the polymer and solvent to phase separate and the polymer to precipitate. The olive oil was washed out of the particles by immersing the particles in acetone, leaving a microporous matrix of PE with resin entrapped therein. The particles were then air-dried for 16 hours. The use of the microporous PE particles allowed the resin in the particles to be mixed in a slurry with the PS coating solution. The slurry was pumped to an air-atomizing nozzle which broke the slurry up into droplets that were sprayed into a water quench bath at 20° C. The PS precipitated in the water quench bath, forming a coating around the resin-containing microporous PE particles.

EXAMPLE 3

Water-soaked Dowex MSC-1 resin was dripped into a polymer coating solution comprising 20 wt % PS dissolved in DMAC. Due to the water impregnated in the resin, the polymer precipitated at the surface of resin particles. Since the particles were in an environment of excess polymer, i.e., the polymer solution, any defects in the coating were quickly covered by the readily available polymer. The beads were sieved from the polymer solution before the coating could redissolve with a wire screen and an air stream was used to blow excess resin off the screen. The coated particles were then placed in water at 20° C. for 14 hours to wash the remaining solvent from the coatings. The so-prepared beads were tested for leaks in the membrane coating by suspending them in salt solution and monitoring increases in the hydrogen ion concentration, which would result from the exchange of $H^+$ from the beads by $Na^+$ leaking through the membrane. Typically, 0.5 g of coated beads (76 wt % cation-exchange resin) was suspended in 10 ml of 0.5M aqueous sodium chloride and pH was monitored as a function of time. During the first 24 hours the pH dropped from approximately 7 to 4.4 ($4 \times 10^{-4}$ mmol of $H^+$ exchanged due to leakage); the pH remained constant for a week thereafter. In a control experiment using 0.5 g of uncoated cation-exchange beads, the pH dropped instantaneously from approximately 7 to 1.1 (0.79 mmol of $H^+$ exchanged, amounting to the total ion exchange capacity for this amount of uncoated beads), indicating that the membrane-coated beads were 99.9% free of leaks.

EXAMPLE 4

Example 3 was repeated with the exception that the polymer coating solution comprised 5 wt % PVDF (Kynar 460, Pennwalt Corp., Philadelphia, Pa.), 10 wt % n-propanol, 5 wt % water, and balance DMAC.

EXAMPLE 5

Membrane-coated beads of Example 3 were tested for their capability to remove ammonia from cell-culture media by suspending them in media spiked with ammonium chloride and measuring the disappearance of ammonia as a function of time using an ammonia-specific electrode. 1.0 g of membrane-coated beads was suspended in 50 ml of 10 mM aqueous ammonium chloride adjusted to pH 11 (a high pH was chosen to increase the concentration of ammonia as the free base, which would increase the ammonia flux, shorten the time required to do the experiment, and increase the signal-to-noise ratio of the ammonia-specific electrode). Ammonia concentration as a function of time is shown in the table below, which shows that (a) the average ammonia flux for the first 0.26 hr of the experiment was approximately 0.5 mmol/hr-g beads; and (b) nearly complete ammonia removal was accomplished in about 24 hours, consistent with the stoichiometry of the coated beads (approximately 1.2 mmol/g coated beads).

| Time (hr) | [NH₃] (mM) |
|---|---|
| 0 | 10.0 |
| 0.03 | 9.50 |
| 0.10 | 9.00 |
| 0.26 | 7.50 |
| 0.53 | 6.50 |
| 1.08 | 6.50 |
| 1.75 | 4.40 |
| 22.8 | 0.20 |

On the basis of the above results, it is estimated that only about 5 g coated beads/L bioreactor volume are required to maintain ammonia at a steady-state subinhibitory concentration of 2 mM in a cell culture grown to a density of $4 \times 10^6$ cells/ml. Cells at this density produce ammonia at a rate of $4.1 \times 10^{-2}$ mmol/hr-L bioreactor. Thus, 5 g of beads will last for about 5 days.

EXAMPLE 6

Pouches of PTFE (Goretex ®, W. L. Gore, Elkton, Md., 0.2 micron pores, 78% porosity, 25 microns thick) having a volume of 50 cc were prepared by heat-sealing the edges of two 8.8 cm² pieces of the Goretex ® and leaving an opening for filling with beads. 0.75 g of beads of Dowex MSC-1 resin were loaded into each pouch along with two stainless steel balls for weight, and the opening sealed. Two such pouches were placed in flasks containing 50 ml water spiked with 10 mM ammonium chloride and stirred at 25° C. and pH 11.0. Ammonia removal is shown over the course of three hours in the table below. Average ammonia flux for the first 0.28 hr was 0.7 mmol/hr-g resin.

| Time (hr) | [NH₃] (mM) |
|---|---|
| 0 | 10.0 |
| 0.03 | 9.00 |
| 0.10 | 8.50 |
| 0.28 | 4.30 |
| 0.70 | 1.35 |
| 1.28 | 0.62 |
| 2.12 | 0.36 |
| 3.03 | 0.22 |

EXAMPLE 7

Example 6 was repeated with the exception that three pouches made of polypropylene (Celgard 2400, Celanese Separations, Raleigh, N.C., 0.02 micron pores, 38% porosity, 25 microns thick) were used. Ammonia removal over 4.5 hours is shown below. Average ammonia flux for the first 0.25 hr 0.3 mmol/hr-g resin.

| Time (hr) | [NH₃] (mM) |
|---|---|
| 0 | 9.5 |
| 0.08 | 9.00 |
| 0.25 | 6.7 |
| 0.50 | 4.8 |
| 1.85 | 0.95 |
| 2.85 | 0.44 |
| 4.50 | 0.17 |

EXMAPLE 8

Two pouches of Example 6 were placed in 50 ml of mammalian cell-culture medium (Dubelco's Modified Eagle's Medium, Sigma Chemical, St. Louis, Mo.) that had been spiked with approximately 10 mM ammonium chloride, and stirred at 25° C. and pH 7.2, with the results shown below. Because of the lower pH, there was less free ammonia than at pH 11.0, and so ammonia flux was substantially lower. Average ammonia flux for the first 16 hours was 0.01 mol/hr-g resin.

| Time (hr) | [NH₃] (mM) |
|---|---|
| 0 | 9.2 |
| 0.12 | 7.9 |
| 0.27 | 7.7 |
| 0.78 | 7.7 |
| 0.93 | 7.5 |
| 2.92 | 7.5 |
| 16.32 | 3.5 |
| 26.47 | 1.6 |

EXAMPLE 9

Anion exchange resin beads (Amberlite ® IRA 400 (OH⁻ form) were coated in substantially the same manner as in Example 3 with PS and approximately 2.0 g of the same were immersed in a 50 ml flask containing 3.3 mM NaCN with a citrate buffer at pH 5.5. HCN removal is shown below. Average HCN flux for the first 0.4 hr was 0.06 mmol/hr-g beads.

| Time (hr) | [HCN] mM |
|---|---|
| 0.00 | 3.3 |
| 0.03 | 2.7 |
| 0.08 | 2.4 |
| 0.15 | 2.6 |
| 0.23 | 2.9 |
| 0.40 | 2.3 |
| 1.10 | 2.4 |
| 2.00 | 2.4 |
| 3.33 | 1.9 |
| 4.53 | 1.7 |
| 6.48 | 1.6 |
| 26.28 | 0 |

EXAMPLE 10

Cyanide was removed from a 50 ml flask containing 5 mM NaCN in a citrate buffer at pH 5.5 by means of a pouch containing approximately 1 g of uncoated Amberlite ® IRA 400 resin and there stainless steel balls. The pouch was prepared from PE-coated Goretex ® having 0.1 micron pores, 78% porosity and 25 microns thick in substantially the same manner as Example 6. Cyanide removal is shown below. Average cyanide flux for the first 0.27 hr was 0.3 mmol/hr-g resin.

| Time (hr) | [HCN] mM |
|---|---|
| 0 | 4.8 |
| 0.03 | 4.6 |
| 0.12 | 4.1 |
| 0.27 | 3.3 |
| 0.50 | 2.2 |
| 1.78 | 1.2 |
| 1.12 | 0.60 |
| 1.77 | 0.45 |
| 2.00 | 0.23 |

EXAMPLE 11

Acetaldehyde was removed from a 50 ml aqueous solution thereof by the use of PE-coated Goretex® pouch prepared from the same membrane material and in substantially the same manner as in Example 10 and filled with 0.7 g Amberlite® IRA 400 resin (in $BH_4^-$ form) and three stainless steel balls. Acetaldehyde depletion is shown below. Average acetaldehyde flux for the first 0.77 hr was 26 mmol/hr·g resin.

| Time (hr) | [$CH_3CHO$] (mM) |
| --- | --- |
| 0 | 136 |
| 0.35 | 125 |
| 0.77 | 108 |
| 1.47 | 73 |
| 3.22 | 33 |
| 4.42 | 20 |
| 6.08 | 11 |

EXAMPLE 12

Dissolved oxygen was removed from a 302 ml aqueous solution that was saturated with 8 ppm $O_2$ by means of two PE-coated Goretex® pouches prepared from the same membrane material and in substantially the same manner as in Example 10, and filled with a trapping agent comprising 0.45 g of glucose oxidase, 0.039 g of catalase and 0.45 g of glucose, all in powder form. After a period of time in the oxygen solution, the powdered trapping agent became wetted sufficiently to become a gel. Oxygen depletion is shown in the table below. Average oxygen flux for the first 15 hours was 0.001 mmol/hr·g trapping agent.

| Time (min) | [$O_2$] (ppm) |
| --- | --- |
| 0 | 8 |
| 2.5 | 7.6 |
| 5.0 | 7.2 |
| 7.5 | 6.5 |
| 10.0 | 5.8 |
| 12.5 | 5.2 |
| 15.0 | 3.9 |
| 17.5 | 3.2 |
| 20.0 | 1.5 |
| 22.5 | 0.2 |
| 25.0 | 0 |

EXAMPLE 13

Dissolved oxygen was removed from a 250 ml aqueous solution saturated with 5 ppm $O_2$ by means of two Goretex® pouches prepared from the same membrane material and in the same manner as in Example 6, and filled with 0.75 g $FeSO_4$ in powder form. After a period of time in the oxygen solution, the powdered trapping agent became wetted sufficiently to become a gel. Oxygen depletion is shown in the table below. Average oxygen flux for the first 4 hours was 0.003 mmol/hr·g trapping agent.

| Time (hr) | [$O_2$] (ppm) |
| --- | --- |
| 0 | 5 |
| 2.0 | 3.42 |
| 4.0 | 2.50 |
| 6.0 | 1.78 |
| 8.2 | 1.19 |
| 10.0 | 0.80 |
| 12.0 | 0.44 |
| 14.0 | 0.39 |
| 16.0 | 0.20 |
| 18.0 | 0.18 |
| 18.3 | 0.12 |

The terms and expressions which have been employed in the foregoing specification are used therein as terms of description and not of limitation, and there is no intention, in the use of such terms and expressions, of excluding equivalents of the features shown and described or portion thereof, it being recognized that the scope of the invention is defined and limited only by the claims which follow.

What is claimed is:

1. An absorbent device for the selective removal of a volatile and trappable chemical species from an aqueous environment comprising at least one core selected from a dense solid, a porous solid and a gel, said core containing at least one trapping agent capable of trapping said chemical species by irreversible reaction with the same, and being continuously enclosed by a semipermeable supported-gas membrane selected from a coating around said core, a capsule enclosing said core, and a hollow fiber enclosing said core and sealed at both ends.

2. The device of claim 1 wherein said core is a dense solid selected from polystyrene, polyacrylate, polyamide, polyester, cellulose acetate and regenerated cellulose.

3. The device of claim 1 wherein said core is a porous solid selected from polystyrene, polyacrylate, polyamide, polyester, cellulose acetate, regenerated cellulose, ceramic, silica, alumina, glass and diatomaceous earth.

4. The device of claim 1 wherein said solid core is a gel.

5. The device of claim 4 wherein said gel consists essentially of a trapping agent, water and a gelling agent.

6. The device of claim 5 wherein said gelling agent is a hydrophilic polymer.

7. An absorbent device for the selective removal of a volatile and trappable chemical species from an aqueous environment comprising at least one core containing at least one trapping agent capable of trapping said chemical species by irreversible reaction with the same, said core being enclosed by a semipermeable supported-gas membrane pouch and being selected from a dense or porous solid of polystyrene, polyacrylate, polyamide, polyester, cellulose acetate and regenerated cellulose.

8. The device of claim 1 or 7 wherein said semipermeable membrane is selected from polyethylene, polypropylene, polysulfone, polyethersulfone, poly(vinylidene difluoride), poly(tetrafluoroethylene) and mixtures thereof.

9. The device of claim 1 or 7 wherein said trapping agent is selected from an acidic agent, a basic agent, a neutral agent, an oxidizing agent and a reducing agent.

10. The device of claim 1 wherein said trapping agent is acidic and is selected from aqueous sulfuric acid liquid, aqueous sulfuric acid gel, the acidic form of polystyrene sulfonate cation exchange resin beads, the acidic form of tetrafluoroethylene sulfonate resin beads, poly(2-acrylamido-2-methyl-1-propanesulfonic acid)

beads, poly(2-acrylamido-2-methyl-1-propanesulfonic acid-co-styrene) beads, poly(acrylic acid)-grafted starch beads.

11. The device of claim 1 wherein said trapping agent is basic and is selected from aqueous sodium hydroxide liquid, aqueous sodium hydroxide gel, aqueous sodium carbonate liquid, aqueous sodium carbonate gel, the basic form of polystyrene quaternary ammonium resin anion exchange beads, poly(alkylamine) beads, liquid poly(ethyleneimine), poly(ethyleneimine) gel, poly(ethyleneimine) on silica gel beads, benzylated poly(ethyleneimine) on silica gel beads, and aqueous tetraethylene pentamine.

12. The device of claim 1 or 7 wherein said trapping agent is an aqueous ethanolamine selected from monoethanolamione, diethanolamine, triethanolamine, 2-amino-2-methyl-1-propanol and 2-(ethylamino)-ethanol.

13. The device of claim 1 or 7 wherein said trapping agent is hydrochromate form of anion exchange resin beads.

14. The device of claim 1 or 7 wherein said trapping agent is poly(vinylpyridine) beads.

15. The device of claim 1 wherein said trapping agent is selected from poly(alkylamine) beads, poly(ethyleneimine) liquid, poly(ethhyleneimine) gel, poly(ethylenimine) on silica beads, benzylated poly(ethyleneimine) on silica beads, aqueous tetraethylene pentamine, the borohydride form of anion exchange resin beads, aqueous hydroxylamine liquid, aqueous hydroxylamine gel, aqueous hydrazine liquid, and aqueous hydrazine gel.

16. The device of claim 1 or 7 wherein said trapping agent is selected from glucose, glucose oxidase and glucose catalase; ferrous sulfate; and a metallo Schiff base complex.

17. The device of claim 1 wherein said trapping agent is selected from glucose, glucose oxidase, glucose catalase, ferrous sulfate, and a metallo Schiff base complex and is coated on particles of diatomaceous earth.

18. The device of claim 1 wherein said trapping agent is selected from aqueous sodium hydroxide liquid, aqueous sodium hydroxide gel, aqueous sodium carbonate liquid, aqueous sodium carbonate gel, the basic form of polystyrene quaternary ammonium anion exchange resin beads, and the borohydride form of anion exchange resin beads.

* * * * *

UNITED STATES PATENT AND TRADEMARK OFFICE
CERTIFICATE OF CORRECTION

PATENT NO. : 5,091,080

DATED : February 25, 1992

INVENTOR(S) : Paul van Eikeren et al

It is certified that error appears in the above-identified patent and that said Letters Patent is hereby corrected as shown below:

Col. 2, Line 23: delete "copoymer" insert --copolymer--

Col. 3, line 29: (in M:) delete "$BH_4^{31}$" insert -- $BH_4^-$ --

Table 1, Col. 3, Line 66: after wine insert --)--

Table 2, Col. 6, Line 6: delete "Poly" (alphy-methylstyrene)" insert --Poly (alpha-methylstyrene)--

Col. 10, Line 7: delete "mol/hr·g" insert --mmol/hr·g--

Col. 10, Line 24: insert --)-- after 400

Col. 10, Line 50: After resin and delete "there" insert --three--

UNITED STATES PATENT AND TRADEMARK OFFICE
CERTIFICATE OF CORRECTION

PATENT NO. : 5,091,080

DATED : February 25, 1992

INVENTOR(S) : Paul van Eikeren et al

It is certified that error appears in the above-identified patent and that said Letters Patent is hereby corrected as shown below:

Col. 13, Line 16: delete "monoethanolamione" insert --monoethanolamine--

Col. 13, Line 21: after agent is insert --the--
Column 14,
Col. 14, Line 3: delete "poly(ethhyleneimine)" and insert --poly(ethyleneimine)--

Signed and Sealed this

Fifth Day of October, 1993

Attest:

BRUCE LEHMAN

*Attesting Officer*  *Commissioner of Patents and Trademarks*